J. F. MONNOT.
COMPOUND METAL BODY AND PROCESS OF PRODUCING SAME.
APPLICATION FILED APR. 24, 1907.
909,924.
Patented Jan. 19, 1909.
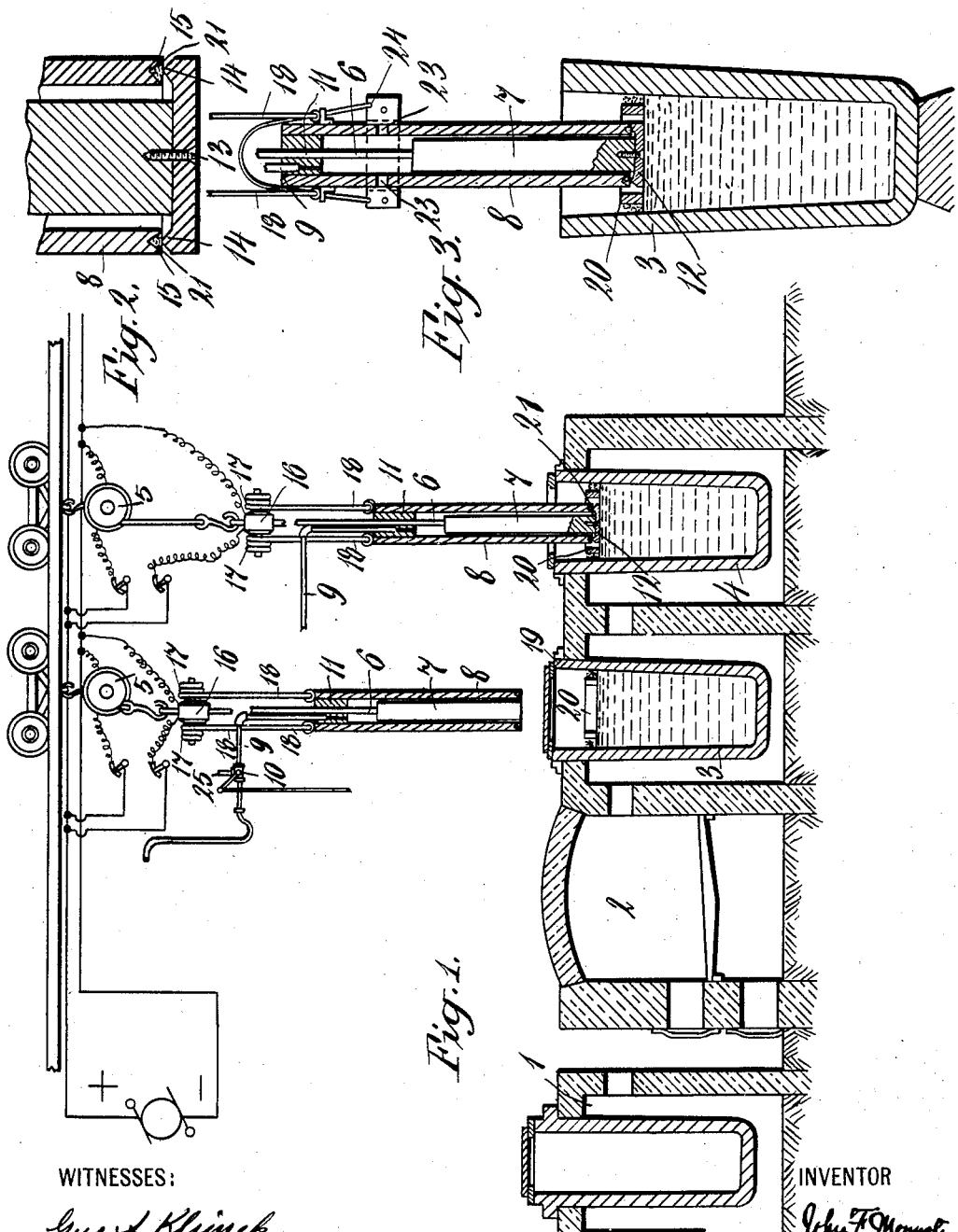
WITNESSES:
INVENTOR
BY
ATTORNEYS

UNITED STATES PATENT OFFICE.

JOHN F. MONNOT, OF NEW YORK, N. Y., ASSIGNOR TO DUPLEX METALS COMPANY, OF NEW YORK, N. Y., A CORPORATION OF NEW YORK.

COMPOUND METAL BODY AND PROCESS OF PRODUCING SAME.

No. 909,924.        Specification of Letters Patent.        Patented Jan. 19, 1909.

Application filed April 24, 1907. Serial No. 369,996.

*To all whom it may concern:*

Be it known that I, JOHN F. MONNOT, a citizen of the United States, residing at New York, in the county of New York and State of New York, have invented certain new and useful Improvements in Compound Metal Bodies and Processes of Producing Same; and I do hereby declare the following to be a full, clear, and exact description of the same, such as will enable others skilled in the art to which it appertains to make and use the same.

Aluminum, magnesium, beryllium (glucinum) and similar light metals, as well as such light alloys as "magnalium", are eminently desirable for many purposes in the arts where an article extremely light but still of metal is required; but where such articles must be made of parts secured together, as in jewelry, knife-handles, and many other similar composite structures, these metals are not as extensively used as their specific gravity and other properties would indicate owing to the practical difficulties attending brazing, soldering and similar operations. These difficulties are largely due to the fact that these light metals are easily oxidized at high temperatures in contact with air, aqueous vapor, etc. On heating in air they form white tarnish coatings which, while frequently not impairing their appearance, are nevertheless fatal to the absolute metallic contacts necessary in soldering, etc. All the ordinary soldering fluids and compositions are more or less acted on by these light metals and are of little use. I have however, discovered that by certain cheap, simple and ready expedients I can procure articles which while having all the substantial advantages of these light metals and alloys are nevertheless as readily worked as the commoner metals; taking solder like copper or silver. If a bar of aluminum be covered with and have united to it a thin impervious coating, even film like, of a readily solderable metal like copper or silver, it may be readily worked by common processes and tools, the film coating taking the solder and preserving the surface of the underlying metal from oxidation or other contamination. The coating metal may be, and usually is, too small in amount to make any substantial difference in the specific gravity of the article. If its superficial appearance be preferable to that of the base metal, as in the case of aluminum with silver coating, the coating may be left, but if the appearance of the underlying metal is required the film coating of the other metal can readily be removed, chemically or mechanically, from the surface beyond the solder line. Or, the coating may be readily electroplated if desired since the film of coating metal will take electrocoatings, as of gold, nickel, etc. Light metals do not themselves readily take such electroplatings. It is necessary however that the coating film be impervious, either for soldering or for electrocoating, to prevent access of corrosive soldering fluids or electroplating fluids to the readily corroded light metal beneath.

For many articles, it is, as stated, desirable to leave the coating, if of an ornamental resistant metal such as copper or silver, in place, as the surface appearance and properties of aluminum, etc., are frequently not desirable. For instance, in culinary utensils, such as kettles, while it is desirable to have a kettle as light and as heat conductive as it is when made of aluminum, nevertheless it is not so desirable to have the aluminum surface appearing. Aluminum is readily attacked by foods containing salt, as soup, and furthermore it is so soft as to mar readily and not to take a good polish, so that corroded spots or dents fill up with dirt and are not readily burnished. It is obvious that for this purpose the protecting coating or films must be a non-porous, as stated to prevent access of soldering fluids or air to the underlying light metals, and must be firmly and permanently attached thereto, forming a union of great mechanical strength. From their porosity and little adherence, electrocoatings do not answer these requirements, and, moreover, they are inordinately difficult to apply to these light and readily oxidizing metals. Neither can such coatings be filmed-on in the usual ways of metal coating as in tinning and galvanizing, the stated oxidation phenomena preventing adherence of metal base and flash coats so applied.

I have discovered that if a body, as a bar, of aluminum in a suitably heated state and with a clean metallic surface have applied thereto a mass of melted copper or silver, preferably at a heat considerably above its melting point, the surface of the bar and the molten metal where contacting, unite so that the joined metals after cooling are inseparable by the action of heat, short of the melting point of one of the metals, or by the action of separating tools. Such a bar if plunged in a heated, clean condition into such a mass of melted copper or silver and quickly withdrawn, brings with it a cohering film of the said other metal united by the described type of union. The converse treatment is also applicable; i. e., the plunging of a bar of silver or copper into a mass of melted aluminum, but the former treatment is preferable for this purpose, as it is usually desirable to have the aluminum for the core.

Where the bar of aluminum, etc., is not to be drawn down or otherwise worked, the film of the coating metal so applied is convenient for many purposes, but generally I prefer to go further; welding on to the filmed bar a further amount of silver or copper at a more convenient casting temperature. This gives an ingot or bar or other shape consisting of a core coated on one or more sides with a layer of the coating metal of appreciable thickness. Upon drawing down the bar into wire or rolling it into plates, the coating metal will be found to follow the base metal throughout its extension and to persist as a coating of substantially the same relative thickness as that on the original ingot, the two metals cohering perfectly together, so as to be inseparable by heat, short of the melting point or operation of cutting tools, or by mechanical stress. If a thick bar of aluminum have autogenously welded thereto by the described process a coating of silver, of, say, 3 per cent. of the whole mass, the thinnest wire or plates extended from the compound bar will also be found to have 3 per cent. of silver. The coating metal having been put on and solidified in place from a fluid state has the general property of fluids and set fluids of being poreless; and in the described extension it is of course compacted further. In such a co-extended article, the coating however thin is absolutely poreless and coheres to its base sufficiently to resist the action of a cold chisel or other tool along the line of union; the tool refusing to follow this line and diverging off into the softer metal.

The following is the description of one method of carrying out my invention: A bar of aluminum is cleaned thoroughly, either chemically or mechanically, and is then heated under conditions precluding oxidation. This heat may be just enough to insure a dry surface, or it may be somewhat higher. Said bar, or ingot, as it will be termed hereafter, is then withdrawn under conditions precluding oxidation and other surface deterioration, and is then plunged momentarily into a bath of silver, copper, or other suitable metal of relatively high melting point, preferably a metal which is not readily oxidizable; such metal being maintained in a very fluid condition, and preferably heated considerably above its melting point. If only a thin coating of copper or other coating metal is desired, the ingot may be withdrawn after a few seconds, under conditions precluding oxidation, and allowed to cool; and when cool will be found to be coated with a thin cohering film of the coating metal having the desirable properties of a metal solidified from the fluid state. Such coating so formed is very thin. If a thicker coating is desired such coating may be formed by confining a portion of the molten metal, of suitable thickness, in contact with the surface of the aluminum body, and then withdrawing said aluminum body and confined layer and permitting the latter to solidify. The compound ingot thus produced is then preferably worked, as by rolling, pressing, hammering or like mechanical operation. As an alternative method, the ingot may be withdrawn, under circumstances precluding oxidation, after a few seconds' contact with the molten metal, and then immersed in a second bath of molten metal maintained, if desired, at a lower temperature, or a temperature more near the melting point, and the main body of the coating formed by confining a layer of the metal of such second bath of suitable thickness against the film-covered surface of the ingot and caused to solidify thereagainst.

In the accompanying illustrations I have shown, more or less diagrammatically, certain material and means adapted to perform the stated process.

In said drawings:—Figure 1 represents a sectional view of one form of apparatus for carrying out the said process. Fig. 2 shows in detail section the construction of bottom plate and lower portion of casing preferably employed. Fig. 3 shows a sectional view of another form of casing which may be employed.

In Fig. 1, 1 is a preliminary heating chamber for the ingot or core, 2 a furnace for heating a crucible 3, containing a body of molten coating metal, and 4 designates a second crucible, which may or may not be used, as desired.

5 designates a power hoist, here shown as an electrical hoist, mounted on a suitable track so that it can be moved from place to place; and from said hoist is suspended, by means of a porter bar 6, the ingot 7, which is the object to be coated. Said ingot is shown surrounded by a casing 8 having an internal diameter slightly larger than the external diameter of the ingot, and to said casing is connected a pipe 9, a portion of which is flexible, said pipe provided with a three-way valve 10. This pipe and the valve 10 are provided for supplying to the casing, when desired, an atmosphere of indifferent or neutral gas, such as producer gas. Casing 8 has a weighted head 11 which insures that when the casing is lowered into the molten metal it shall sink therein to the depth desired. 12 designates a bottom plate for the casing arranged to be secured to the ingot 7 itself, by means of a screw 13. Said bottom plate is provided with a raised rib or ring 14 matching a corresponding groove 15, in the lower edge of the casing, and adapted to coact with said groove to make a tight joint. For raising and lowering the casing 8 with respect to the ingot 7, a special hoist 16, suspended like porter bar 6 from hoist 5, is provided. It has, in the form shown, two winding drums 17 upon which are wound two cables 18 connected to opposite sides of the casing, so that said casing may be raised and lowered truly vertically.

I customarily provide the crucible with a loose removable cover 19, which cover is designed to exclude air from the molten metal so far as possible, and is removed only when and so long as necessary to lower an ingot and casing into the crucible, or to inspect the molten metal, or for similar reason. To further exclude air from the surface of the molten metal, I cover so much of its surface as possible with a layer of charcoal, a ring 20 of refractory material which floats on the surface of the molten metal serving to maintain a clear space in the center for the passage of the ingot and casing.

As an alternative to the above described apparatus for carrying out my process, I may use that shown in Fig. 3, which is much the same as that above described except that the casing 8 is provided with inlets 23 in its sides, said inlets arranged to be closed at will by a sliding shield or valve 24. In carrying out the process with this apparatus the casing without the bottom plate 12 thereon is placed over the heating chamber 1, said casing being at the time filled with a protective atmosphere as above described, and the porter bar is lowered down through the casing, secured to the ingot or core to be coated and raised up into said casing again with the said ingot or core. The casing with the core 7 within it is then moved to one side, the bottom plate 12 applied, and then the casing is moved over the crucible 3 containing molten coating metal, and is lowered into said molten metal; the valve or closure 24 being raised as the openings 23 come to the surface of the molten metal so that said casing fills through said openings 23. The casing with ingot and molten metal within it is then raised and the molten metal allowed to cool as before. In carrying out the process in this way, the protective atmosphere within the casing when the filling holes 23 are open, protects the surface of the ingot and the molten metal which enters the casing against oxidation; and in fact no air can enter the casing, because the holes 23 are submerged in the molten metal almost instantly after the closure 24 is raised, and during the possible brief instant while said openings are open but not completely submerged the outrush of gas from the casing will prevent the entrance of air.

To hasten the filling of the casing with molten metal, and to prevent trapping of gas in the molten metal as it solidifies, I preferably apply suction to the outlet 25 of valve 10, having first set said valve so as to cut off the entrance of gas and to place outlet 25 in communication with the interior of the casing. This is done, however, only after the molten metal has commenced to flow in. And when necessary or expedient, I reduce the fluid pressure upon the joint between the bottom plate and casing, while raising either the casing shown in Fig. 1 or the casing shown in Fig. 3, by applying suction to the outlet 25 of valve 10.

Instead of applying the coating in a single operation, as above described, I may apply it in two operations, film-coating the ingot 7 by immersing it momentarily in the molten metal in crucible 3 and then, without lowering the casing into the molten metal, withdrawing the ingot, now covered with a thin film-coating formed by the action of the molten metal, back into the casing, moving said casing over the crucible 4, the molten metal in which is preferably at ordinary casting temperature or thereabout, applying the bottom plate to the ingot, lowering said ingot into the metal of bath 4 and thereafter lowering the casing and so confining against the film-coated surface a layer of the metal from bath 4, and then withdrawing the casing with its contens from the molten metal and permitting the molten metal within it to solidify. Or, instead of using the apparatus of Fig. 1, that of Fig. 3 may be used; the consequent variation in the procedure just described being obvious.

In application filed September 6, 1906, Sr. No. 333,570, I have described and claimed a method of forming weld-like unions between unlike metals by contacting the surface of one such metal with a molten mass of the other such metal maintained at a reactive condition much above its ordinary melting and casting temperature, which reactive condition is termed by me the supermolten condition. The supermolten condition is particularly necessary when it is sought to unite non-ferrous metals such as copper, silver and aluminum directly to ferrous metals such as iron and various steels. When uniting aluminum and silver, copper or like metal, it is not so important that the molten metal be in the supermolten condition but it is convenient to have it in such condition; and such molten metal should always be quite fluid. In forming the coating by the double dipping operation just above described, using both crucibles of the furnace, the metal in crucible 3, whether or not it be the same as the metal in crucible 4, will ordinarily be maintained at considerably higher temperature than that of crucible 4. By a reverse of the above operation, aluminum may be applied to gold, silver, copper, and, when the molten aluminum is maintained at the supermolten condition, to iron.

The coating process herein described is applicable to the procuring of autogenously welded coatings on aluminum or other noble metals, like gold. Gold-silver alloys; gold-copper, silver-copper and gold-aluminum alloys may be so welded on, obtaining the distinctive appearance thereof. Where a very thin coating of gold is placed on the original ingot and co-extension of the joined metals carried to a high degree, the gold coating may be obtained as an excessively thin film, showing the optical properties of such thin gold films.

In stamping out articles from a compound plate formed in the manner described, by the use of a round-edged or obtunding tool, the coating metal may be caused to flow or extend beyond the cut edges of the base metal, thereby shielding such edges.

Various uses for the compound metal produced as herein described will suggest themselves. One important feature of the invention is that it provides a satisfactory method of joining aluminum articles or surfaces by soldering or brazing—which has not been found commercially practicable heretofore. While aluminum and the other light metals and alloys do not solder or braze readily, silver and copper do solder and braze readily. By coating aluminum surfaces with copper or silver in the manner above described, such surfaces may be united by brazing or welding together the copper or silver surfaces in the manner customary in brazing silver or copper. This opens up a wide field for the use of aluminum and aluminum coated metal. For instance, in making match boxes or similar articles of aluminum, a bar or ingot of aluminum may be coated with 2 or 3 per cent. of silver in the way described; rolled out hot into a plate of the thickness desired, and from this stamped out a plurality of the shapes desired; in this instance, that of the two halves of the boxes desired. These halves may then be soldered together exactly as if of solid silver, and then, if the aluminum surface be desired, the silver removed from the surface beyond the solder line by a short dip into nitric acid. In a plate of the thickness used for this purpose 2 or 3 per cent. of silver contribute only an infinitesimal portion of the weight or thickness of the whole article; and it requires but little acid.

In making chains, the bar may be extended to wire and the links soldered in the same way. Tea kettles may be made like the match safe, the spouts and hinges being soldered on the plate before removal of the silver, if it be removed. It is obvious that an infinity of different useful articles may be made in the same way.

What I claim is:—

1. The process of making compound metal bodies which consists in contacting aluminum and another non-ferrous metal of relatively high melting point, one of said metals in a solid condition, the other in a freely liquid molten condition, and causing a layer of such molten metal to form on and solidify on the surface of such solid metal.

2. The process of making compound metal bodies which consists in contacting a solid base of aluminum with a non-ferrous metal, the latter at a temperature much above its melting point, and causing a layer of such metal to solidify on the aluminum surface.

3. The process of making compound metal bodies which consists in contacting a base of aluminum with silver at a temperature much above its melting point and causing a layer of such silver to solidify on such aluminum surface.

4. The process of uniting light-metal articles which consists in covering such articles with a welded-on coating of a solderable metal and soldering together the surfaces to be united.

5. The process of uniting light-metal articles which consists in covering such articles with a welded-on coating of silver and soldering together the surfaces to be united.

6. The process of uniting aluminum to other metal bodies which consists in covering such aluminum articles with a welded-on coating of silver and causing it to solidify thereon, and soldering the so-coated aluminum article with another solderable surface with which it is to be united.

7. The process of making compound metal bodies which consists in contacting aluminum and another non-ferrous metal of relatively high melting point, one of said metals in a solid condition, the other in a freely liquid molten condition, and causing a layer of such molten metal to form on and solidify on the surface of such solid metal, and removing the coating from the unsoldered surfaces.

8. As a new article of manufacture, a compound metal article comprising a body of a metal of the light-metal group having inseparably united and cohering thereto a dense, poreless and impervious layer of an unlike non-ferrous metal of high melting point, said joined metals being in metallic contact at all points between abutting surfaces and being molecularly united.

9. As a new article of manufacture, a compound metal article comprising a body of a metal of the light-metal group having inseparably united and cohering thereto a dense, poreless and impervious layer of a high-melting noble metal, said joined metals being in metallic contact at all points between abutting surfaces and being molecularly united.

10. As a new article of manufacture, a compound metal article comprising a body of aluminum having inseparably united and cohering thereto a dense, poreless and impervious layer of an unlike non-ferrous metal of high melting point, said joined metals being in metallic contact at all points between abutting surfaces and being molecularly united.

11. As a new article of manufacture, a compound metal article comprising a body of aluminum having inseparably united and cohering thereto a dense, poreless and impervious layer of silver, said joined metals being in metallic contact at all points between abutting surfaces and being molecularly united.

12. As a new article of manufacture, a compound metal article comprising a body of metal comprising aluminum, said body having inseparably united and cohering thereto a dense, poreless and impervious layer of silver, said joined metals being in metallic contact at all points between abutting surfaces and being molecularly united.

13. As a new article of manufacture, a compound metal article comprising bodies of metal of the light-metal group, each such body having inseparably united and cohering thereto a layer of a readily-solderable high-melting non-ferrous metal, said joined metals being in metallic contact at all points between abutting surfaces and being molecularly united and the said readily-solderable layers of different light-metal bodies being soldered together.

14. As a new article of manufacture, a compound metal article comprising bodies of aluminum, each such body having inseparably united and cohering thereto a layer of a readily-solderable high-melting non-ferrous metal, said joined metals being in metallic contact at all points between abutting surfaces and being molecularly united, the said readily-solderable layers of different aluminum bodies being soldered together.

15. As a new article of manufacture, a compound metal article comprising bodies of aluminum, each such body having inseparably united and cohering thereto a layer of silver, said joined metals being in metallic contact at all points between abutting surfaces and being molecularly united and the silver layers of said bodies being soldered together.

16. As a new article of manufacture, a compound metal article comprising two or more united bodies of aluminum, each such body at the point of union carrying an inseparably united and cohering layer of silver, the joined silver and aluminum being in metallic contact at all points between abutting surfaces and being molecularly united and being united to a similar silver layer of another of said bodies by a solder union.

In testimony whereof I affix my signature, in the presence of two witnesses.

JOHN F. MONNOT.

Witnesses:
BYRON E. ELDRED,
JAS. K. CLARK.